Jan. 30, 1962 T. G. THOMAS ETAL 3,018,853
FLUID COOLED VEHICLE DRUM BRAKE
Filed Nov. 6, 1958 4 Sheets-Sheet 1

INVENTORS
THOMAS G. THOMAS
WALTER E. TAYLOR
THAYLUS EMBREE
BY D. C. Staley
THEIR ATTORNEY Jan. 30, 1962 T. G. THOMAS ETAL 3,018,853
FLUID COOLED VEHICLE DRUM BRAKE
Filed Nov. 6, 1958 4 Sheets-Sheet 2
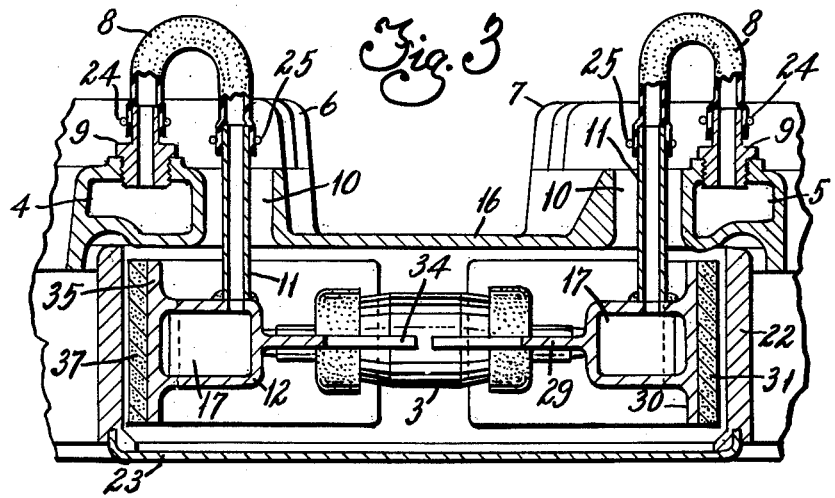
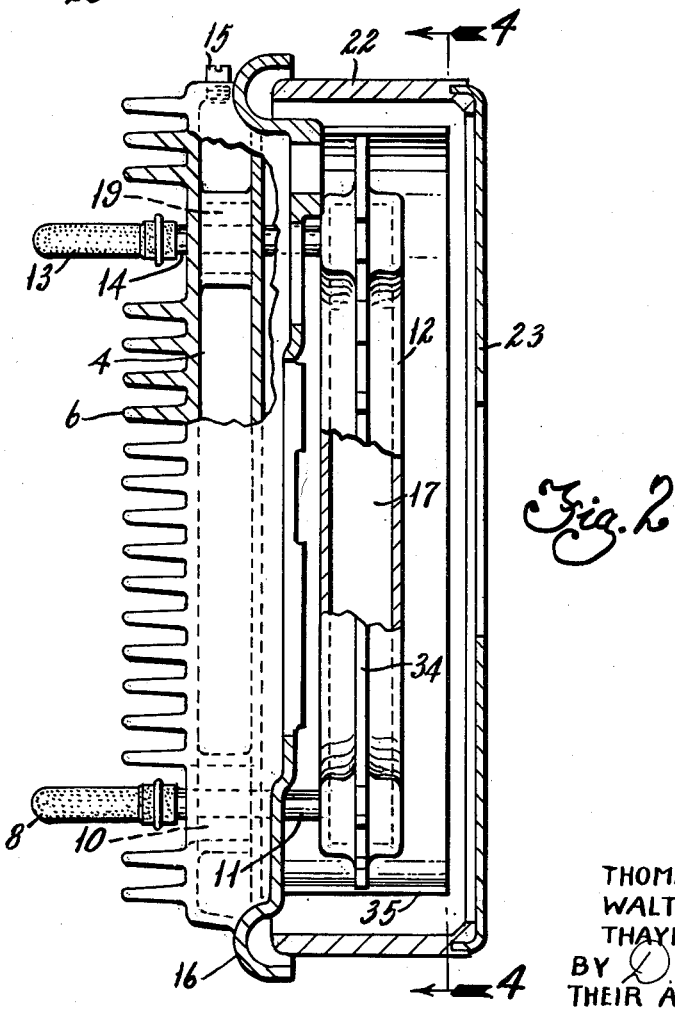
INVENTORS
THOMAS G. THOMAS
WALTER E. TAYLOR
THAYLUS EMBREE
BY
THEIR ATTORNEY Jan. 30, 1962 T. G. THOMAS ETAL 3,018,853
FLUID COOLED VEHICLE DRUM BRAKE Filed Nov. 6, 1958 4 Sheets-Sheet 3

INVENTORS
THOMAS G. THOMAS
WALTER E. TAYLOR
THAYLUS EMBREE
BY D. E. Staley
THEIR ATTORNEY

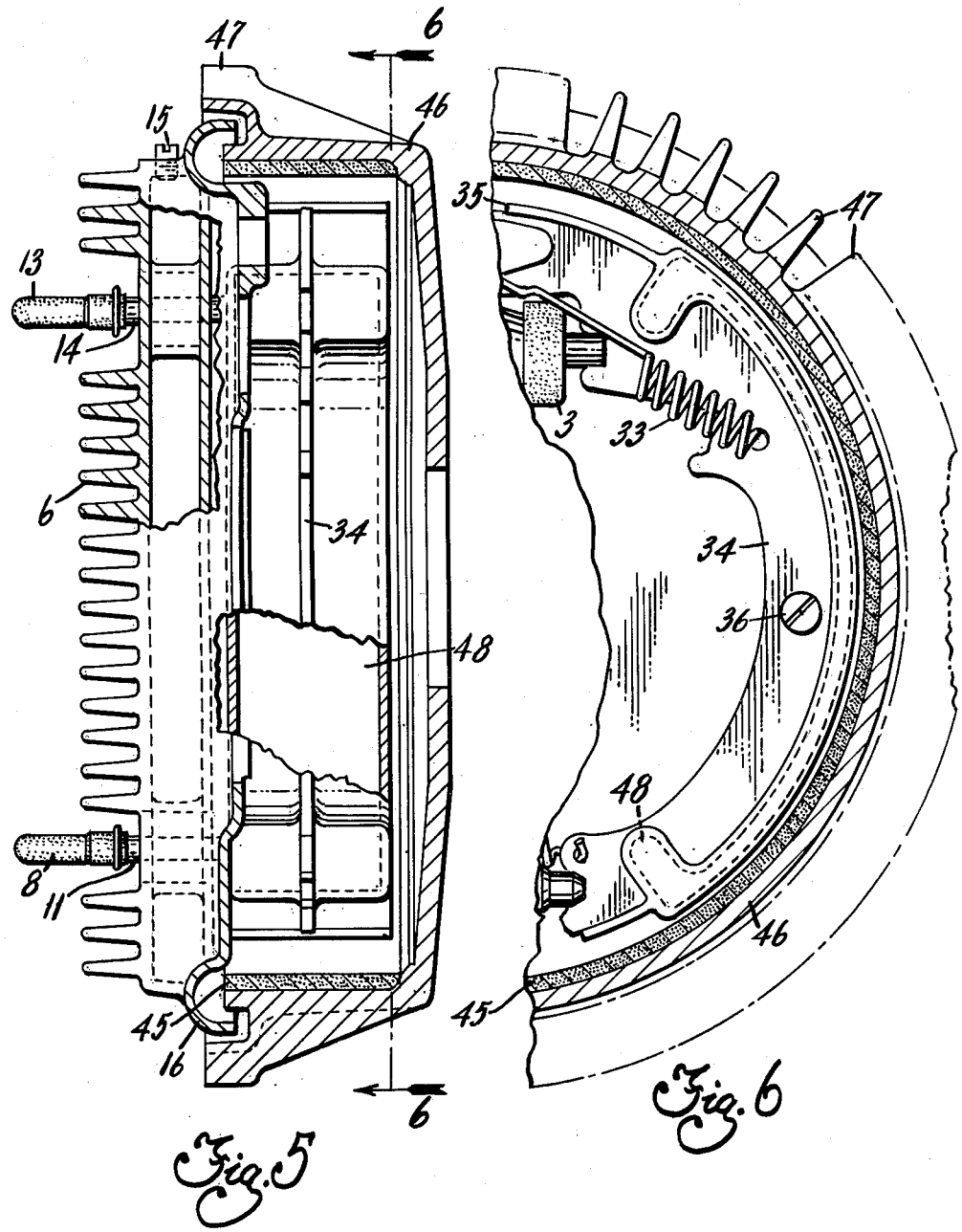

3,018,853
FLUID COOLED VEHICLE DRUM BRAKE
Thomas G. Thomas, Bedford, Walter E. Taylor, Seymour, and Thaylus Embree, Mitchell, Ind., assignors to General Motors Corporation, Detroit, Mich., a corporation of Delaware
Filed Nov. 6, 1958, Ser. No. 772,231
2 Claims. (Cl. 188—78)

This invention relates to a vehicle drum brake and more particularly to a fluid cooling means for cooling the brake shoes and additional means for radiating heat from the cover plate.

The majority of brakes function to convert kinetic energy of the moving vehicle to heat energy. The heat generated is dependent upon the weight of the vehicle and the speed of the vehicle at the time of braking for a given deceleration. With the increased size and speed of vehicles, it becomes necessary to provide some means of dissipating the heat generated within the braking structure of a motor vehicle. An adequate dissipating means could be provided by a fluid system to convey the heat from the internal portion of the braking structure to some external point where the heat may be radiated to the atmosphere.

It is the object of this invention to provide a fluid cooling system which is self-contained within the braking structure of a motor vehicle. This fluid system provides cooling of each of the brake shoes and also provides a reservoir on an external point of the braking structure.

It is another object of this invention to provide a self-contained fluid system which circulates the fluid within the system by means of convection currents. The convection currents are set up within the system by the heating of the fluid within the ducts of the brake shoes and then the fluid circulates to a reservoir on the external point on the brakes. By a process of radiation, the reservoir fluid is cooled.

It is a further object of this invention to provide radiating fins on the external portion of the reservoir located on the backing plate. The backing plate carries two reservoirs, one for each brake shoe within the braking structure.

It is a further object of this invention to provide a friction material within the inner periphery of the rotating drum to provide more rapid heat transfer through the all metal brake shoes to the internal fluid chamber.

It is a further object of this invention to provide radiating fins about the external periphery of the brake drums.

The objects of this invention are accomplished by means of providing fluid passages within the brake shoes. The brake shoes are placed in a vertical position as in the conventional type of vehicle drum brake. A reservoir is also provided for each of these brake shoes on the inboard side of the backing plate. These two reservoirs are each connected to the corresponding brake shoe at two points, thereby forming two separate fluid systems. An outlet port from the reservoir is connected to an inlet port on the brake shoe at its lower portion by a flexible conduit. An inlet port for the reservoir and an outlet port for the brake shoe is also provided by means of a flexible conduit on their upper portions. This provides closed fluid systems for free circulation of a fluid from the lower portion of the reservoir into the lower portion of the brake shoe and thence upward and out of the brake shoe and into the reservoir. This process of circulation is caused when the brake shoes become heated from the kinetic energy dissipated within the braking structure. The heated fluid circulates through the brake shoe and thence through the reservoir. A reservoir is provided with radiating fins to radiate the heat to the atmosphere and thereby provide cooling of the braking structure.

The original structure of this invention provides for friction material on each of the brake shoes. This invention is also modified by providing friction material around the inner periphery of the brake drum. Radiating fins may also be placed on the outer periphery of the rotating brake drum when it is anticipated that an excess of heat may be generated within the braking structure.

Further objects and advantages of the present invention will be apparent from the following description, reference being had to the accompanying drawings wherein preferred embodiments of the present invention are clearly shown.

In the drawings:

FIGURE 1 is a side elevation view of the backing plate of the braking structure. This view shows the radiating fins and two separate reservoirs mounted on the inboard side of the backing plate.

FIGURE 2 is a cross-sectional view taken on line 2—2 of FIGURE 1. Portions of the braking structure are broken away to clarify the location of the various parts and passages. It is noted, too, that some of the parts are removed for clarification.

FIGURE 3 is a cross-sectional view taken on line 3—3 of FIGURE 1. This view shows the two reservoirs and the two passages in the brake shoes with connecting flexible conduits.

FIGURE 5 is a cross-sectional view of a modified version of the braking structure. This version shows the friction material on the inner periphery of the brake drum. Various parts are removed and portions of the braking structure are broken away for clarification.

FIGURE 6 is a cross-sectional view taken on line 6—6 of FIGURE 5. This view shows the relationship of the various parts on the internal portion of the braking structure.

Figure 1:
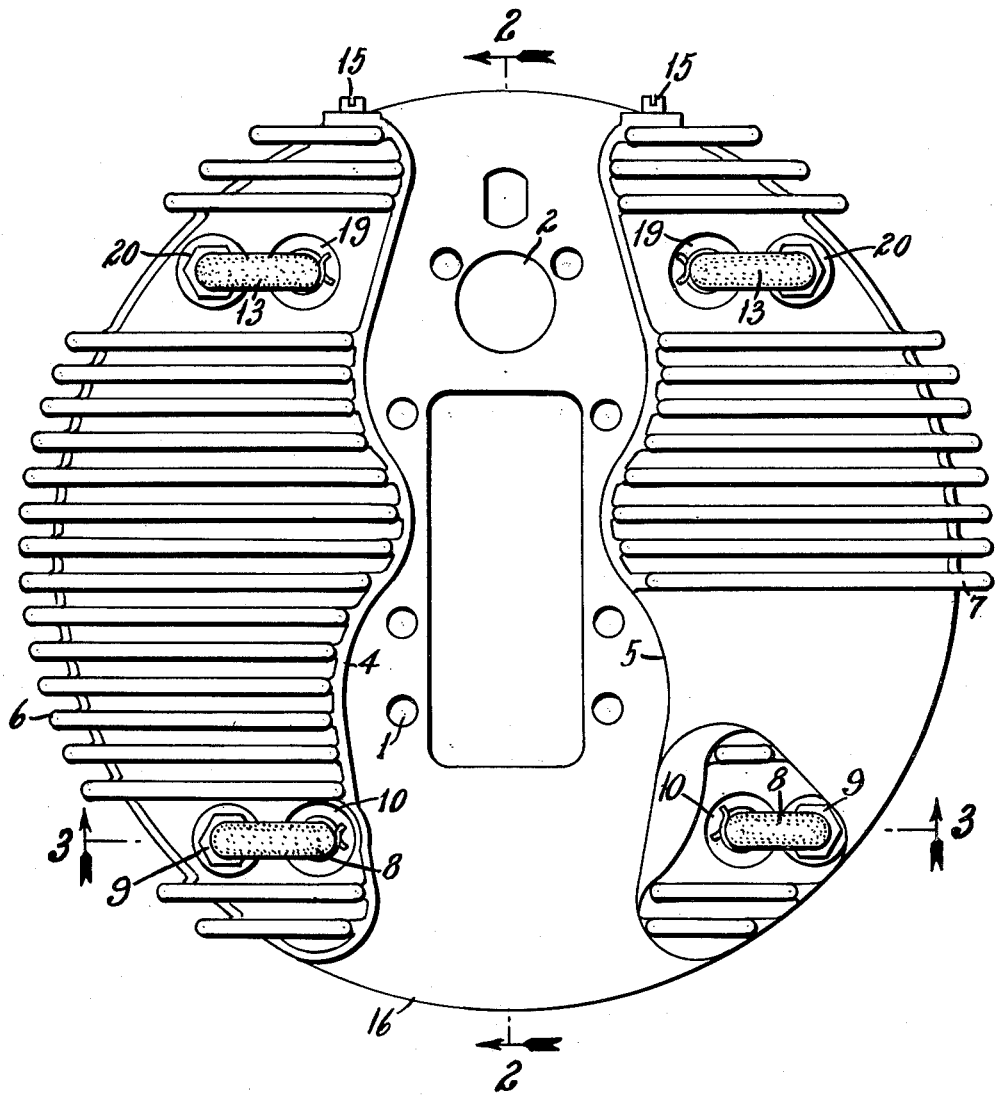

FIGURE 1 illustrates a backing plate or anchor plate for the braking structure. Bolt holes are indicated at 1 for mounting the backing plate to the vehicle. The hole 2 is used for mounting of the wheel cylinder 3. A reservoir 4 is shown on the left hand side of the backing plate and a reservoir 5 on the right hand side of the backing plate. Radiating fins 6 and 7 are provided on these reservoirs for cooling of the fluid within. A flexible conduit 8 is connected to a fitting 9 adjoining the reservoir 4 in the backing plate. This flexible conduit 9 enters through the backing plate by hole 10 and is connected to a tube 11 which is directly connected to a shoe 12 within the braking structure. An outlet passage means is provided by means of the flexible conduit 13 which is connected to a similar tube 14 on the upper portion of the shoe 12. The openings 10 and 19 which pass through the backing plate also pass through the reservoir in the backing plate. At the upper end of the backing plate, a filler plug 15 is provided.

Radiating fins 6 and 7 are provided on the inboard side of the backing plate 16. These radiating fins 6 and 7 are placed horizontally to provide rapid passage of air around the inboard side of the backing plate. Placing the fins in this position provides maximum cooling of the backing plate when the vehicle is in motion. The reservoir 5 on the right hand side of the backing plate of FIGURE 1 is the same general structure as that of the reservoir 4 as previously described. Some of the fins, however, are removed to provide for mounting on the vehicle.

FIGURE 2 illustrates a cross-sectional view showing the braking structure. The wheel cylinder and various parts have been removed for clarification of the fluid system within the braking structure. The brake shoe 12 is shown with a portion of the passage wall broken away. The passage 17 extends from the lower portion of the brake shoe 12 to the upper portion of the brake shoe 12. The lower portion of this passage is connected by the tube 11 and, in turn, is connected by the flexible conduit 8.

The upper portion of the brake shoe 12 is connected by a tube 14 to provide an outlet passage of the brake fluid. This tube 14 is connected to the flexible conduit 13 which, in turn, is connected to the upper inlet fixture 20 of reservoir 4. This view also shows a portion of the reservoir wall broken away. It is noted that the opening 19 provides a passage through the reservoir 4 and the backing plate 16 for tube 14. The reservoir 4 is also shown in this view with a portion of the wall broken away to give a clearer view.

The brake drum 22 is shown about the outer periphery of the brake shoe 12. The brake drum 22 is also provided with a mounting plate 23 for mounting of the wheel.

FIGURE 3 illustrates the cross-sectional view of the connecting conduit between the reservoir and the lower portion of the brake shoe 12. The flexible conduit 8 is connected to a fitting 9 which threadedly engages the reservoir 4. A snap ring 24 is provided to lock the flexible conduit 8 in position on the fitting 9. The opposite end of the flexible conduit 8 is connected to the tube 11 and maintained in position by a snap ring 25. As illustrated in this view, the opposite shoe and reservoir are connected by a similar flexible tube with fittings and connections. This view illustrates the opening 10 for receiving the tube 11 which is directly connected to the shoe 12.

Figure 4:
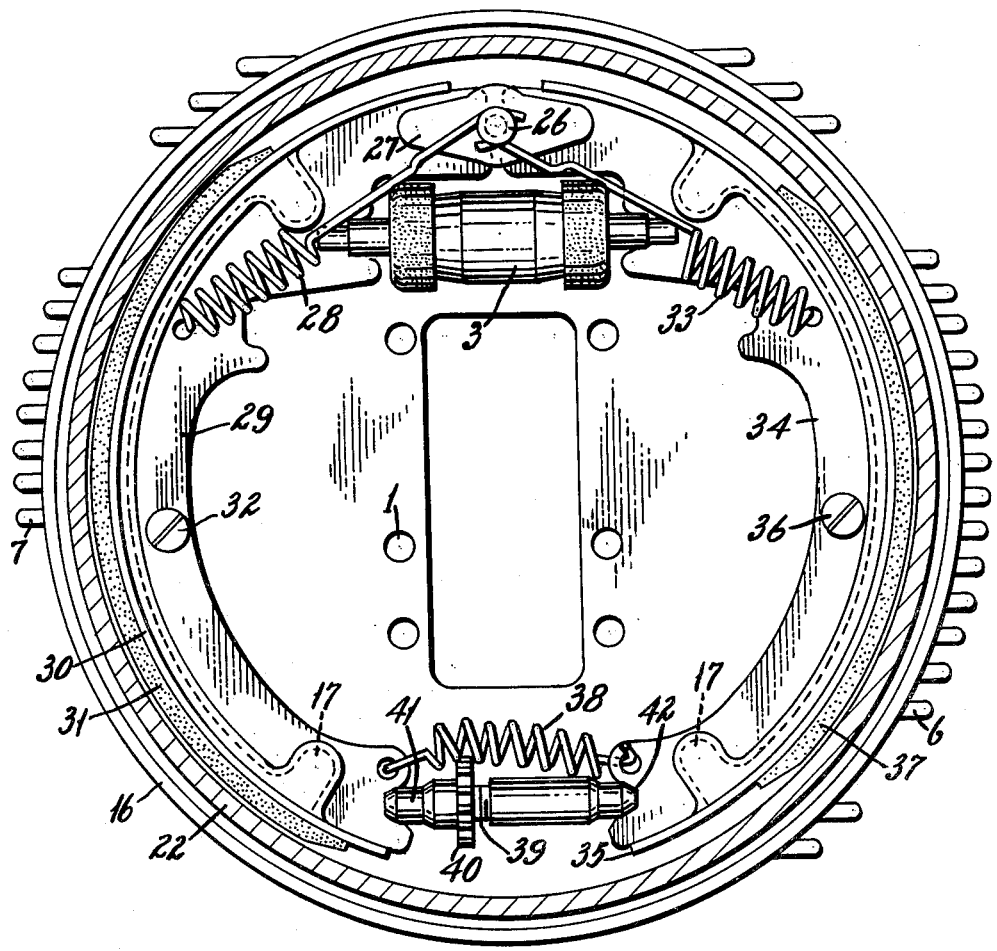
FIGURE 4 is a cross-sectional view taken on line 4—4 of FIGURE 2. This view shows the parts and their relation within the internal portion of the braking structure.

FIGURE 4 illustrates the relationship of the various parts within the braking structure. The backing plate 16 provides an anchoring means for anchor pin 26. The rotating drum 22 is mounted adjacent to and concentric with the backing plate 16. A washer 27 is mounted on the anchor pin 26 and maintains the brake shoe webbings which rests in their retracted position against the anchor pin in a spaced relation to the return springs. The return spring 28 is directly connected to the anchor pin 26 and the brake shoe webbing 29 of the primary brake shoe 30. A friction material 31 is mounted on the primary brake shoe 30 for frictionally engaging a rotating brake drum 22. The primary brake shoe 30 is supported by means of the pin assembly 32.

A return spring 33 is directly connected to the anchor pin 26 and the secondary brake shoe webbing 34. The secondary brake shoe 35 is supported by a pin assembly 36 which is mounted on the backing plate. A friction material 37 is also provided on the external portion of the secondary brake shoe 35 for frictionally engaging the rotating drum 22.

Two of the adjacent ends, one of the primary brake shoe webbing 29 and one of secondary brake shoe webbing 34 are resiliently connected by means of a spring 38. An adjustable strut comprising a screw member 39 carrying a ratchet wheel 40 and cooperating with the sleeve members 41 and 42 is operating with the sleeve members 41 and 42 is operatively maintained between the primary and secondary brake shoes.

FIGURES 5 and 6 illustrate the modified version of this fluid cooled braking structure. The fluid system comprises the passage means within the brake shoe, the connecting conduit means between the brake shoe and the reservoirs within the backing plate. The friction material, however, in this structure is not provided on the radially outer side of the brake shoes. The friction material 45 is shown mounted on the inner periphery of the drum 46. The drum 46 is also provided with radiating fins 47 about the outer periphery of the brake drum 46. These fins are shown on the modified version wherein the frictional material is placed on the inner periphery of the brake drum, but these fins may also be used on either version of this invention where maximum cooling capacity is needed. It is noted that the fluid passages 48 of the brake shoes have a greater contact area adjacent their frictional engagement with the rotating drum friction material 45. The applicant does not wish to limit the conducting area on the brake shoe on either version of this invention.

The brake cooling means provided for within this braking structure operates in this manner: The brake shoe passages, the connecting conduits, and the backing plate reservoirs are filled through plug 15 with a suitable fluid for a cooling medium. As the brakes are actuated by means of wheel cylinder 3, the primary shoe 30 and the secondary shoe 35 are expanded outwardly toward the rotating drum 22. This creates a friction between the friction material 31 of the primary shoe 30 and the friction material 37 on the secondary shoe 35 and the rotating drum 22. This frictional engagement with the drum causes heat to be dissipated within the braking structure and particularly on the brake shoes. The brake shoes are provided with a passage means within their structure adjacent to the friction material on the radially outer side of the shoes. As the heat is dissipated within the brake shoe, the fluid within the brake shoe passage is heated and thereby tends to rise. The heated and expanded fluid within the brake shoe passage then moves upward by means of the convection currents set up within the brake shoe. The fluid then passes outward through the upper flexible conduits and into the corresponding reservoirs on the backing plate. The cooler fluid in the reservoir passes inward through the flexible conduit on the lower portion of the reservoirs and the brake shoes.

The more rapid the heating and the greater the temperature difference between the fluid in the brake shoes and the reservoirs, the more rapid the circulation within the fluid system. As the fluid within the reservoirs becomes heated, the fins on the inboard side of the backing plate also become heated due to the conduction of heat from the reservoirs. The passing of air over these fins creates a cooling effect of the fins and the reservoirs themselves. The process of circulation by means of the convection currents and the outside cooling by means of the fins through conduction and radiation produces a cooling means for the braking structure.

While the embodiments of the present invention as herein disclosed constitute preferred forms, it is to be understood that other forms might be adopted.

What is claimed is as follows:

1. A vehicle brake structure comprising in combination, a unitary backing plate structure, hollow chamber means extending vertically of said backing plate structure and inboard thereof with the outboard wall of the chamber means constituted by a portion of the backing plate, a plurality of external radiating fins on the inboard wall of said chamber means, a rotatable brake drum positioned adjacent to and concentric with said backing plate structure and forming therewith a brake shoe enclosing structure, a brake shoe positioned generally vertically within the confines of said brake drum for frictionally engaging said drum, a wheel cylinder within the confines of said drum operatively engaging one end of said brake shoe, shoe adjusting means cooperating with the opposite end of said shoe, said shoe including spaced wall means forming passage means within said brake shoe extending generally longitudinally of said shoe, flexible conduit means connecting the vertically disposed lower portion of said passage means with the vertically disposed lower portion of said chamber means, other conduit means connecting the vertically disposed upper portion of said passage means with the vertically disposed upper portion of said chamber means to provide thereby a closed generally vertically circulating thermal convection fluid circuit for cooling fluid contained therein for cooling of said brake shoe.

2. A vehicle brake structure comprising in combination, a unitary backing plate structure having two hollow chamber means therein extending vertically of said backing plate structure one each at opposite sides of the axis of the backing plate structure and inboard thereof with the outboard wall of the chamber means constituted by a portion of the backing plate, a plurality of external radiating fins on the inboard wall of said chamber means, a rotatable brake drum positioned adjacent to and concentric with said backing plate structure and forming therewith a brake shoe enclosing structure, two brake shoes positioned generally vertically within the confines of said brake drum one each at opposite sides of the axis of the backing plate for frictionally engaging said drum, wheel cylinder means within the confines of said drum operatively engaging one end of the respective brake shoes, shoe adjusting means cooperating with the opposite ends of the respective shoes, said shoes each including spaced wall means forming passage means within the respective brake shoes extending generally longitudinally of said shoes, flexible conduit means connecting the vertically disposed lower portion of the respective passage means with the vertically disposed lower portion of the respective chamber means on the same side of the axis of said backing plate structure, other conduit means similarly connecting the vertically disposed upper portion of the respective passage means with the vertically disposed upper portion of the respective chamber means to provide thereby closed generally vertically circulating thermal convection fluid circuits for cooling fluid contained therein for each of said shoes for cooling of the respective brake shoes.

References Cited in the file of this patent

UNITED STATES PATENTS

| | | |
|---|---|---|
| 1,952,967 | Boughton | Mar. 27, 1934 |
| 2,008,728 | Sauzedde | July 23, 1935 |
| 2,012,662 | Frank | Aug. 27, 1935 |
| 2,274,503 | Reid | Feb. 24, 1942 |
| 2,294,329 | Ayers et al. | Aug. 25, 1942 |
| 2,726,742 | Dunz | Dec. 13, 1955 |
| 2,821,271 | Sanford | Jan. 28, 1958 |
| 2,911,075 | Damiron | Nov. 3, 1959 |